Oct. 31, 1961  S. GELLER  3,006,855
FERRIMAGNETIC GARNETS
Filed April 29, 1959  2 Sheets-Sheet 1

INVENTOR
S. GELLER
BY
ATTORNEY

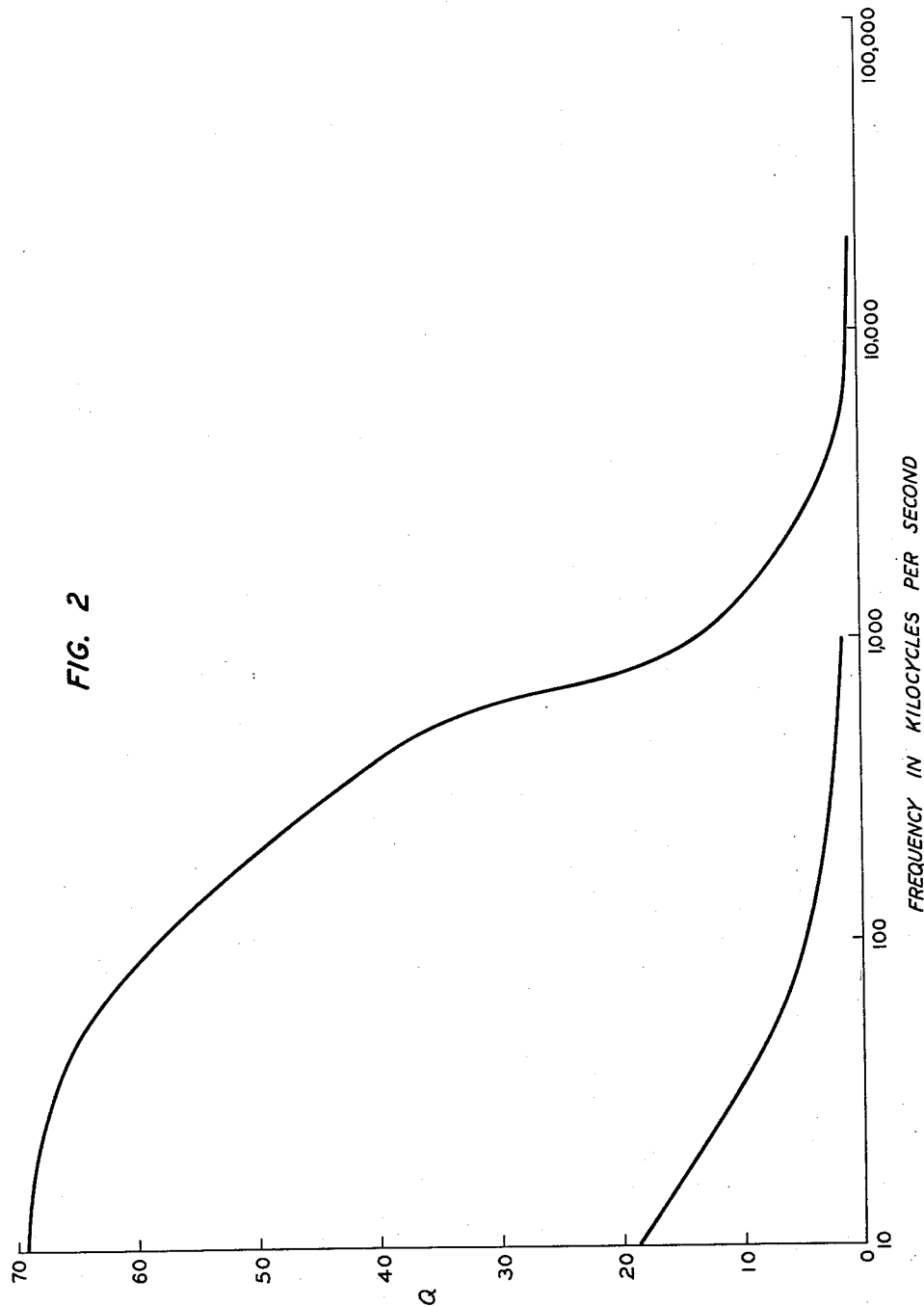

United States Patent Office 3,006,855
Patented Oct. 31, 1961

3,006,855
FERRIMAGNETIC GARNETS
Seymour Geller, Morristown, N.J., assignor to Bell Telephone Laboratories, Incorporated, New York, N.Y., a corporation of New York
Filed Apr. 29, 1959, Ser. No. 809,636
6 Claims. (Cl. 252—62.5)

This invention relates to a new group of ferrimagnetic materials and to microwave components employing such materials.

The use of ferrite materials in electromagnetic wave transmission systems has given rise to a host of new and extremely useful transmission components. The utility of the ferrite materials in such applications inheres in their ability to absorb energy in the microwave region. Thus, for example, if the ferrite material is biased by a steady magnetic field certain electron combinations within the ferrite are aligned with the field. If a high frequency electromagnetic field is then applied to the ferrite at right angles to the magnetic field, the electrons begin to precess at a frequency determined by the strength of the magnetic field. The energy required by the precessing electrons is absorbed from the high frequency electromagnetic field, and such field is thereby attenuated. When the frequency of the high frequency energy equals the frequency of the precessing electrons, a resonant condition is produced. At such resonant condition the absorption of energy by the ferrite material is greatest. This ability of the ferrite material to absorb energy has been utilized in microwave components such as resonance attenuators and modulators.

Ferrite materials when properly disposed in a wave guide and biased by a magnetic field will produce a rotation of the plane of polarization of an incident plane polarized electromagnetic wave. This phenomenon is known as Faraday rotation.

In the operation of microwave components employing ferrite materials, the direction of the biasing magnetic field determines the manner in which the high frequency energy is affected. This property of ferrite materials has led to the development of non-reciprocal devices such as the attenuators described above, and also to devices which utilize the property of Faraday rotation possessed by the ferrite materials.

The prepaartion of ferrite materials is more properly classified as an art rather than as a science. Most ferrites may be considered to be solid solutions to which one or several chemical elements are added in varying quantities to impart a particular characteristic. Because of their complex nature minor changes in processing conditions may affect reproducibility. In certain classes of ferrites the degree of chemical combination may have a pronounced effect on the magnetic characteristics of the material. For these and other reasons the discovery of a new class of stoichiometric compounds exhibiting ferrimagnetic properties has provoked great interest.

These materials, which are of the garnet structure, not only possess most of the magnetic properties found in conventional ferrites, but in addition exhibit certain magnetic properties which make their use in microwave applications uniquely advantageous.

One of the most important advantages of garnet materials over conventional ferrites is the fact that these materials are compounds having a definite composition. Accordingly, these garnets may be prepared with a high degree of reproducibility thereby assuring little or no variation in the operation of microwave devices and components embodying them.

The most well known of these garnet materials, yttrium-iron garnet, has the formula $Y_3Fe_2(FeO_4)_3$. There are eight such formula units in a unit cell of this garnet. Three of the five iron ions present in a formula unit are located in sites tetrahedrally surrounded by oxygen ions and two iron ions are located in sites octahedrally surrounded by oxygen ions. The magnetic moment of this garnet is the result of interaction between the iron ions in these two different lattice sites, and corresponds to the difference in the number of iron ions in the two sites. Thus, the saturation magnetic moment of this garnet is 5 Bohr-magnetons which corresponds to the moment of the one iron ion present in a tetrahedral site in excess of the iron ions in the octahedral sites.

It has been determined that other rare earth ions may be substituted for the yttrium ion the garnets so produced having been found to exhibit substantially the same type of ferrimagnetic properties as the yttrium-iron garnet. (See article by R. Pauthenet in Comptes Rendus, Vol. 243, page 1499, 1956.)

In accordance with the present invention, solid solutions of yttrium-iron garnet and other rare earth iron garnets with new garnet compounds $Ca_3Fe_2Sn_3O_{12}$, $Ba_3Fe_2Sn_3O_{12}$, and $Sr_3Fe_2Sn_3O_{12}$ exhibit magnetic moments which are substantially higher than that of the rare earth iron garnets in their pure state. The increase in magnetic moment is attributed to the substitution of the non-magnetic tin ions for the magnetic iron ions which occupy the octahedral sites of the rare earth-iron garnet. Since such substitution decreases the number of iron ions in the octahedral sites, the difference between the number of iron ions in tetrahedral sites and those in octahedral sites increases, and the magnetic moment also increases.

By virtue of their higher magnetic moments, the solid solutions of this invention enhance the operation of microwave components and devices heretofore constructed with conventional ferrites or pure rare earth-iron garnets. Additionally, the discovery of these solid solutions forms the basis for development of new electrical devices which may be designed so as to take advantage of the improved properties of the solid solutions of this invention.

Microwave device applications of the solid solutions of this invention include gyrators, circulators and other microwave components depending for their operation on Faraday rotation. The operation of such devices and of other similar components is to be found in an article by C. L. Hogan in the Bell System Technical Journal, Vol. 31, at page 1 et seq. Other devices, such as directional phase shifters, resonance isolators, field displacement circulators and others for which the solid solutions of this invention are suitable are fully discussed in a paper by Fox, Miller and Weiss published in the Bell System Technical Journal, Vol. 34, No. 1, pages 5 through 103.

The invention is more readily understood when taken in conjunction with the following drawings in which:

FIG. 2 is a graph of Q versus frequency for both pure yttrium-iron garnet and a solid solution of this invention.

Figure 1:
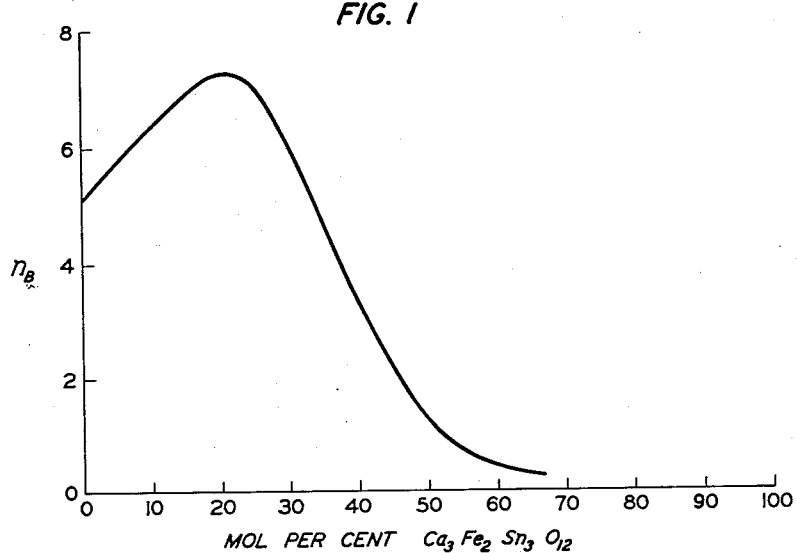
FIG. 1 is a graph depicting the saturation magnetic moment of one of the solid solutions of this invention as a function of the composition thereof.

With reference now to FIG. 1, there is depicted a graph of the saturation magnetic moment ($n_B$) of one of the solid solutions of this invention as a function of composition. The effect depicted is typical of that of all of the solid solutions of this invention. The solid solutions whose magnetic moments are depicted in FIG. 1 consist of yttrium-iron garnet ($Y_3Fe_5O_{12}$) and calcium-tin garnet ($Ca_3Fe_2Sn_3O_{12}$) in varying proportions. It is noted that the saturation magnetic moment of pure yttrium-iron garnet is approximately 5 Bohr-magnetons. Initially, additions of calcium-tin garnet produce an increase in magnetic moment of the resulting solid solution. As indicated by the curve of FIG. 1, the magnetic moment of solid solutions of these substituents attains a maximum of approximately 7.2 at a composition of approximately 20 mol percent of calcium-tin garnet and 80 mol percent of yttrium-iron garnet, and the improvement is thereafter reduced by further additions of calcium-tin garnet. Thus, as shown in FIG. 1, solid solutions containing up to approximately 33 mol percent of calcium-tin garnet exhibit magnetic moments greater than that of pure yttrium-iron garnet. The theoretical aspects of this phenomenon are discussed in detail below.

FIG. 2 is a graph of Q versus frequency for pure yttrium-iron garnet and a solid solution of this invention represented by the formula

$(Y_3Fe_5O_{12})_{11/12}(Ca_3Fe_2Sn_3O_{12})_{1/12}$

As is well known, the value of Q is indicative of the quality of an inductive material or component in the sense that it represents the ratio of energy stored to energy dissipated. The methods of measuring the Q of ferrimagnetic materials are well known and are described in detail in Tables of Dielectric Materials, Volume 4, published by the Laboratory of Insulation Research at Massachusetts Institute of Technology.

As indicated in FIG. 2, the value of Q for the solid solution far exceeds that of pure yttrium-iron garnet in the range of frequencies from 10 kilocycles to 1,000 kilocycles. Thus, for example, at a frequency of 100 kilocycles, the value of Q of the solid solution is approximately twelve times as high as that of pure yttrium-iron garnet. Accordingly, devices operating within the aforementioned frequency range are made more efficient by use of the solid solution rather than customary yttrium-iron garnet. Although these measurements were conducted on one specific solid solution of this invention, it is to be appreciated that the other solid solutions of this invention also possess this advantageous property.

Figure 3:
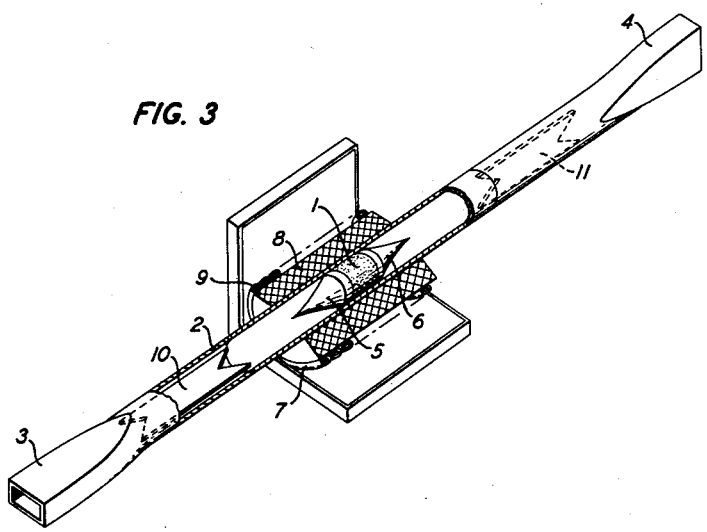
FIG. 3 is a perspective view partly in section of a microwave component containing an element consisting of a solid solution of this invention.

FIG. 3 depicts a Faraday rotation device which is intended to be exemplary of the wide range of microwave components in which solid solutions of this invention may be suitably employed. The device of FIG. 3 comprises element 1 composed of one of the solid solutions of this invention disposed in a circular wave guide 2. Two rectangular wave guides 3 and 4 are connected with circular wave guide 2 as shown. That portion of circular wave guide 2 containing element 1, which element is butted to tapered portions 5 and 6 which may consist of a dielectric material such as polystyrene, is encompassed by structure 7 comprising electrical winding 8 and cooling coil 9. Electrical winding 8 is energized by an electrical source not shown to produce a horizontal magnetic field in the region of element 1, the said field being sufficient to bias element 1 close to magnetic saturation. Radial vanes 10 and 11 are inserted for the purpose of absorbing reflections. For the device shown, vane 10 is so placed as to absorb horizontally polarized waves while radial vane 11 is so positioned to absorb vertically polarized waves. Tapered portions 5 and 6 are intended to reduce reflections so absorbed.

A complete description of the mode of operation of the device depicted in FIG. 3 is beyond the scope of this description. The principles of operation of this element are discussed in detail in the article by C. L. Hogan to which reference is made above.

The increase in magnetic moment of the solid solutions of this invention as indicated in FIG. 1 is attributed to the changes in the yttrium-iron garnet structure which occur upon the formation of the solid solution. It has been determined that the formation of a solid solution between the garnets of this invention with yttrium-iron garnet results in a substitution of tin ions for some of the iron ions situated in the octahedral positions. As stated above, the magnetic moment of yttrium-iron garnet corresponds to the moment of the one iron ion present in a tetrahedral site in excess of the iron ions in the octahedral sites. Substitution of a non-magnetic ion for one of the two iron ions in the octahedral sites therefore increases the difference in the number of iron ions occupying octahedral and tetrahedral sites. As a result, the magnetic moment of such a structure increases.

As shown in FIG. 1, the magnetic moment of solid solutions of yttrium-iron garnet with calcium-tin garnet attains a maximum at approximately 20 mol percent calcium-tin garnet. Further additions of calcium-tin garnet result in a decrease of the magnetic moment as shown. The mechanism which causes a decrease in magnetic moment with increasing substitution of tin for iron ions in the octahedral position has not been definitely established. However, such decrease in magnetic moment is believed to be the direct result of the overall decrease of magnetic ions in the system.

For each substitution of a trivalent iron ion by a tetravalent tin ion, a divalent ion replaces the trivalent yttrium ion to maintain the proper balance in the structure. In the solid solutions of FIG. 1, such divalent ion is calcium. However, since tin is the active substituent in the calcium-tin garnet which produces the increase in magnetic moment, the substitution of barium or strontium for the calcium has no apparent effect on the mechanism by which the magnetic moment is increased. However, unlike the calcium-tin garnet-yttrium-iron garnet system, wherein a complete solid solution range exists, strontium-tin garnet is soluble in yttrium-iron garnet only up to approximately 33 mol percent and barium-tin garnet is soluble only up to approximately 5 mol percent. It is noted that solid solutions containing less than .1 mol percent of a tin garnet of this invention exhibit magnetic properties substantially identical to those of pure yttrium-iron garnet.

The solid solutions of this invention may be prepared by any one of several techniques customarily employed in the ceramic field. One method found to produce satisfactory solid solutions involves the preparation of the solid solution directly rather than forming each garnet material separately and subsequently forming a solid solution therebetween. In accordance with this method, the necessary chemical elements, in the form of oxides or carbonates, are mixed in stoichiometric proportions. The mixture is then pressed into a pellet and calcined at a temperature in the preferred range of from 1350° C. to 1450° C. for a period of approximately one to three hours. The pellet is then cooled, ground and remixed, and then pressed and refired at a temperature in the above preferred range for a second period of approximately one to three hours. The latter sequence of steps is repeated one or more times to attain a homogeneous garnet structure, a procedure well known in the art. The duration of the firing steps may be increased in accordance with conventional ceramic practice.

The substitution of tin for iron in the solid solutions of this invention which produces the resulting increased magnetic moment requires that the solid solutions be possessed of a garnet structure. Following the third firing step of the procedure outlined above, an X-ray powder diffraction photograph of the material is made to determine the presence of the requisite garnet structure. The details of analysis and the method of making such X-ray powder photographs are well known in the art. The original work on the mineral garnet structures is discussed in detail in an article by G. Menzer in Zeitschrift fur Kristallographie, vol. 69, page 300, 1928. Solid solutions produced in accordance with this invention yield an X-ray diffraction photograph from which lattice constants may be determined. Since the lattice value of the constant is dependent on the composition of the solid solution, this is a means of assuring that a solid solution of particular composition has been produced.

As is well known in the art, single crystals of ferrimagnetic material have certain magnetic properties not exhibited by the material when in its polycrystalline state. In particular, the resonance line widths of single crystal materials are much narrower than those found in the polycrystalline material, this property forming the basis for the types of microwave devices described in copending application Serial No. 778,352, filed December 5, 1958, by P. K. Tien, and Serial No. 774,172, filed November 17, 1958, by R. W. De Grasse. It is to be understood that single crystals of the solid solutions of this invention are also suitable for use in microwave applications of the type described in the above copending applications.

The data from which the graph of FIG. 1 was constructed were obtained from solid solutions of the present invention made in accordance with the general procedure outlined above. The following illustrative examples include some of the solid solutions whose magnetic characteristics form the basis for the graph of FIG. 1.

*Example 1*

A solid solution represented by the formula $(Y_3Fe_5O_{12})_{5/6}(Ca_3Fe_2Sn_3O_{12})_{1/6}$ was produced in the following manner:

The following materials in the quantities noted were ground and mixed in an agate mortar.

| Material: | Quantity, grams |
|---|---|
| $Fe_2O_3$ | 0.7187 |
| $Y_2O_3$ | 0.5646 |
| $CaCO_3$ | 0.1001 |
| $SnO_2$ | 0.1507 |

The mixture was pressed into a pellet and calcined at a temperature of 1350° C. for a period of approximately two hours.

The pellet was then cooled to room temperature, reground, pressed into a pellet and fired at a temperature of 1350° C. for a period of approximately two hours.

The pellet was again cooled to room temperature, reground, pressed and fired at a temperature of 1400° C. for a period of approximately two hours.

An X-ray powder diffraction photograph taken of the material indicated that the solid solution had a garnet structure.

The saturation magnetic moment of the solid solution was measured in the customary manner and was determined to be approximately 7 Bohr-magnetons.

*Example 2*

A solid solution represented by the formula $(Y_3Fe_5O_{12})_{5/6}(Sr_3Fe_2Sn_3O_{12})_{1/6}$ was produced in accordance with the general procedure described in Example 1, the raw materials, used being as follows:

| Material: | Quantity, grams |
|---|---|
| $Fe_2O_3$ | 0.7186 |
| $Y_2O_3$ | 0.5646 |
| $SrCO_3$ | 0.1476 |
| $SnO_2$ | 0.1507 |

The mixture was pressed into a pellet and calcined at a temperature of 1400° C. for a period of approximately two hours.

The pellet was then cooled to room temperature, reground, pressed into a pellet and fired at a temperature of 1400° C. for a period of approximately two hours. This procedure was repeated twice.

An X-ray powder diffraction photograph taken of the material indicated that the solid solution was possessed of a garnet structure.

*Example 3*

A solid solution represented by the formula $(Y_3Fe_5O_{12})_{.95}(Ba_3Fe_2Sn_3O_{12})_{.05}$ was produced in accordance with the general procedure described in Example 1, the raw materials used being as follows:

| Material: | Quantity, grams |
|---|---|
| $Fe_2O_3$ | 0.3870 |
| $Y_2O_3$ | 0.3218 |
| $BaO$ | 0.0230 |
| $SnO_2$ | 0.0226 |

The mixture was pressed into a pellet and calcined at a temperature of 1350° C. for a period of approximately two and one-half hours.

The pellet was then cooled to room temperature, reground, pressed into a pellet and fired at a temperature of 1360° C. for a period of approximately two hours. This procedure was repeated once.

An X-ray powder diffraction photograph taken of the material indicated that the solid solution was possessed of a garnet structure.

Although the illustrative examples described above involve the use of yttrium-iron garnet, it is to be understood that the other rare earth iron garnets in which yttrium is replaced wholly or in part by one or more of the rare earth elements are within the scope of this invention. Thus, for example, the principles described above with respect to yttrium-iron garnet-calcium-tin garnet solid solutions apply equally well to solid solutions of calcium-tin garnet with lanthanum-iron garnet, cerium-iron garnet, neodymium-iron garnet and others.

As discussed above, the material calcium-tin garnet has been here reported for the first time. This material has only insignificant magnetic properties but, as indicated, is desirably added to magnetic garnets such as yttrium-iron garnet and other rare earth iron garnets to improve their magnetic properties, notably magnetic moment. As also noted, such properties are significantly affected by addition of as little as .1 mol percent. By the same token, inclusion of as little as .1 mol percent of magnetic rare earth garnet in a solution also containing a garnet of this invention shows measurable magnetic properties. It is seen that solid solutions of rare earth iron garnets containing from .1 mol percent up to about 33 mol percent of calcium-tin garnet show significantly improved properties. As is seen from FIG. 1, a range of inclusion of calcium-tin garnet in an yttrium-iron garnet of from about 7 mol percent to about 30 mol percent results in an improvement in magnetic moment of the order of at least about 20 percent. For the purposes herein it is considered that this defines a preferred range of inclusion.

The phrase "microwave component" as it appears in the specification and appended claims refers to all components which employ ferrimagnetic materials and is intended to include non-reciprocal phase shifting devices including gyrators, rotators, and circulators, devices such as resonance attenuators and modulators, traveling wave tubes, resonant cavity structures, switches, couplers and the like.

The chemical formulas set worth in the appended claims are intended only as indicative of the relative proportions of the stated chemical elements in the claimed material.

It is to be appreciated that the solid solutions described herein are intended merely as illustrative of the present invention and variations may be made therein by one skilled in the art without departing from the spirit and scope of this invention.

What is claimed is:

1. A ferrimagnetic garnet consisting essentially of a solid solution having a garnet structure represented by the formula $(M_3Fe_2Sn_3O_{12})_x(Y_3Fe_5O_{12})_y$, where M is a divalent cation selected from the group consisting of Ca, Ba, and Sr, where $x$ is at least .001 but less than 1, and $y$ equals $(1-x)$.

2. A ferrimagnetic garnet consisting essentially of a solid solution having a garnet structure represented by the formula $(Ca_3Fe_2Sn_3O_{12})_x(Y_3Fe_5O_{12})_y$ where $x$ is at least .001 but less than 1, and $y$ equals $(1-x)$.

3. A ferrimagnetic garnet consisting essentially of a solid solution having a garnet structure represented by the formula $(Ca_3Fe_2Sn_3O_{12})_x(Y_3Fe_5O_{12})_y$ where $x$ is at least .001 but less than $\frac{1}{3}$, and $y$ equals $(1-x)$.

4. A ferrimagnetic garnet consisting essentially of a solid solution having a garnet structure represented by the formula $(Ca_3Fe_2Sn_3O_{12})_x(Y_3Fe_5O_{12})_y$ where $x$ equals approximately .2 and $y$ equals approximately .8.

5. A ferrimagnetic garnet consisting essentially of a solid solution having a garnet structure represented by the formula $(Sr_3Fe_2Sn_3O_{12})_x(Y_3Fe_5O_{12})_y$ where $x$ is at least .001 but less than $\frac{1}{3}$, and $y$ equals $(1-x)$.

6. A ferrimagnetic garnet consisting essentially of a solid solution having a garnet structure represented by the formula $(Ba_3Fe_2Sn_3O_{12})_x(Y_3Fe_5O_{12})_y$ where $x$ is at least .001 but less than .05, and $y$ equals $(1-x)$.

References Cited in the file of this patent

UNITED STATES PATENTS

| | | |
|---|---|---|
| 2,659,698 | Berge | Nov. 17, 1953 |
| 2,715,109 | Albers-Schoenberg | Aug. 9, 1955 |
| 2,900,344 | Stuyts et al. | Aug. 18, 1959 |

FOREIGN PATENTS

| | | |
|---|---|---|
| 737,284 | Great Britain | Sept. 21, 1955 |
| 763,494 | Great Britain | Dec. 12, 1956 |

OTHER REFERENCES

Maxwell et al.: Physical Review, December 15, 1954, pp. 1503, 1504.

Bertaut et al.: Comptes Rendus, vol. 242, pp. 382–384 (1956).

Pauthenet: Comptes Rendus, vol. 243, pp. 1499–1502 (1956).

Hogen: Bell System Tech. J., vol. 31, pp. 1–31.

Fox et al.: Bell System Tech. J., vol. 34, pp. 5–103.